United States Patent
Lin et al.

(10) Patent No.: US 8,120,862 B2
(45) Date of Patent: Feb. 21, 2012

(54) CAMERA MODULE WITH FOCUSING SPRING

(75) Inventors: Hou-Yao Lin, Taipei Hsien (TW); Chai-Wei Lee, Taipei Hsien (TW); Sheng-Jung Yu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 212 days.

(21) Appl. No.: 12/728,256

(22) Filed: Mar. 21, 2010

(65) Prior Publication Data

US 2011/0096422 A1     Apr. 28, 2011

(30) Foreign Application Priority Data

Oct. 26, 2009   (CN) .......................... 2009 1 0308801

(51) Int. Cl.
*G02B 7/02* (2006.01)
(52) U.S. Cl. ...................................................... 359/822
(58) Field of Classification Search ................... 359/822
See application file for complete search history.

(56) References Cited

U.S. PATENT DOCUMENTS 7,609,323 B2 *   10/2009   Choi et al. .................... 348/374

* cited by examiner

*Primary Examiner* — Joseph P Martinez
(74) *Attorney, Agent, or Firm* — Altis Law Group, Inc.

(57) ABSTRACT

A camera module includes a lens barrel, a lens holder, and a focusing spring. The lens barrel includes an operation plate and a first body, and the outer diameter of the operation plate exceeds that of the first body, thereby a staging surface is formed facing the first body. The first body includes an outer surface, and defines an external thread on the outer surface. The lens holder includes a second body, and defining a second receiving hole therethrough. The second body includes an upper surface and an inner surface, and defines an internal thread on the inner surface. The lens barrel is received in the second receiving hole, and the external thread of the lens barrel is screwed and meshed with the internal thread of the lens holder. The focusing spring is compressively interposed between the staging surface and the upper surface.

8 Claims, 4 Drawing Sheets

CAMERA MODULE WITH FOCUSING SPRING

BACKGROUND

1. Technical Field

The present disclosure relates to camera modules and, particularly, to a camera module with a focusing spring.

2. Description of Related Art

A conventional camera module often includes a lens holder and a lens barrel screwed to mesh with the lens holder via a plurality of threads. When focusing the camera module, the thread teeth of the lens barrel need to be spirally moved along the threads of the lens holder. However, the friction of the thread teeth between the lens holder and the lens barrel is uneven, thereby resulting in focus instability.

Therefore, it is desirable to provide a camera module, which can overcome the above-mentioned limitations.

DETAILED DESCRIPTION

Embodiments of the disclosure are now described in detail with reference to the drawings.

Figure 1:
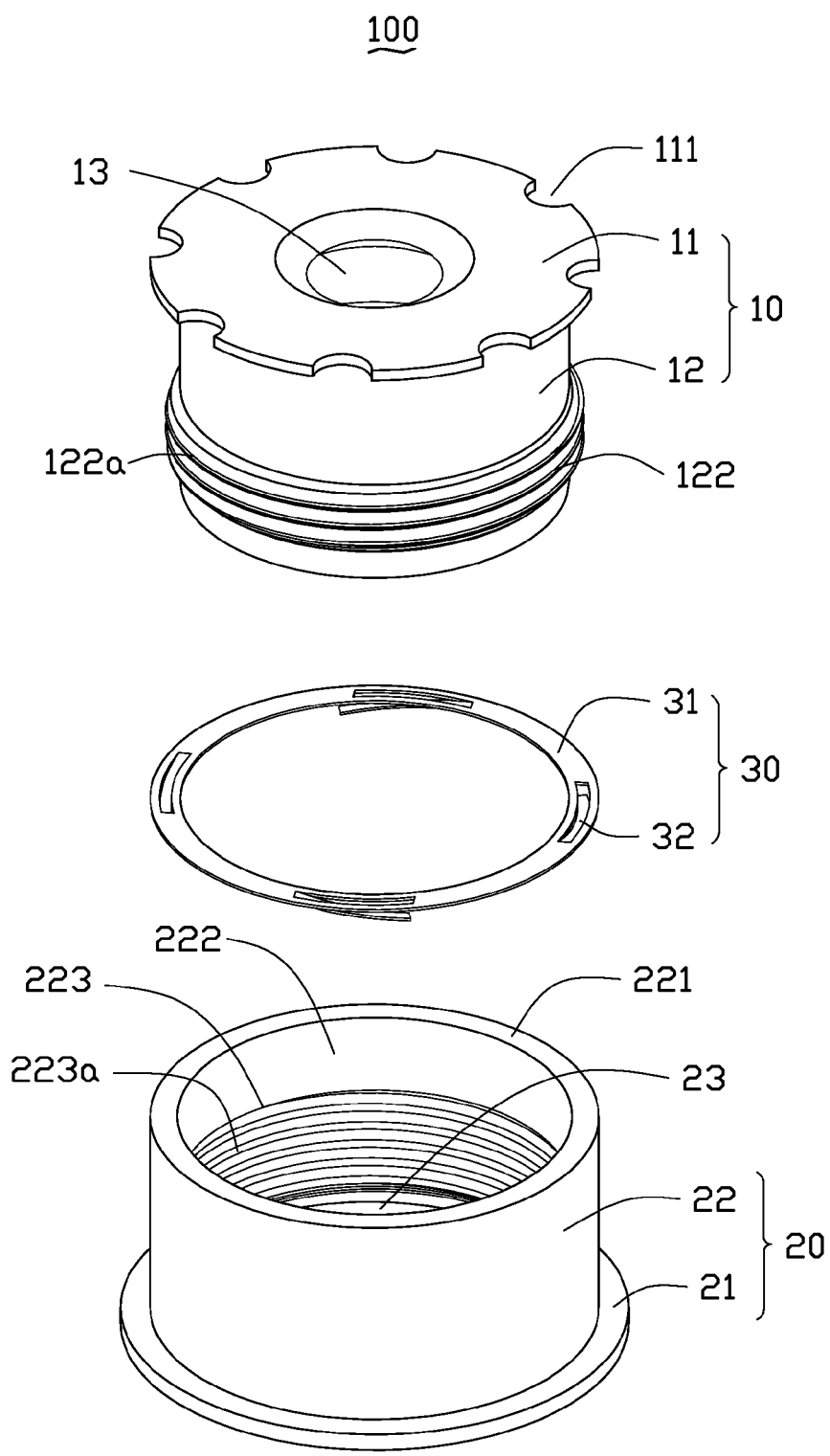
FIG. 1 is an isometric and exploded view of a camera module, according to an exemplary embodiment.
Figure 2:
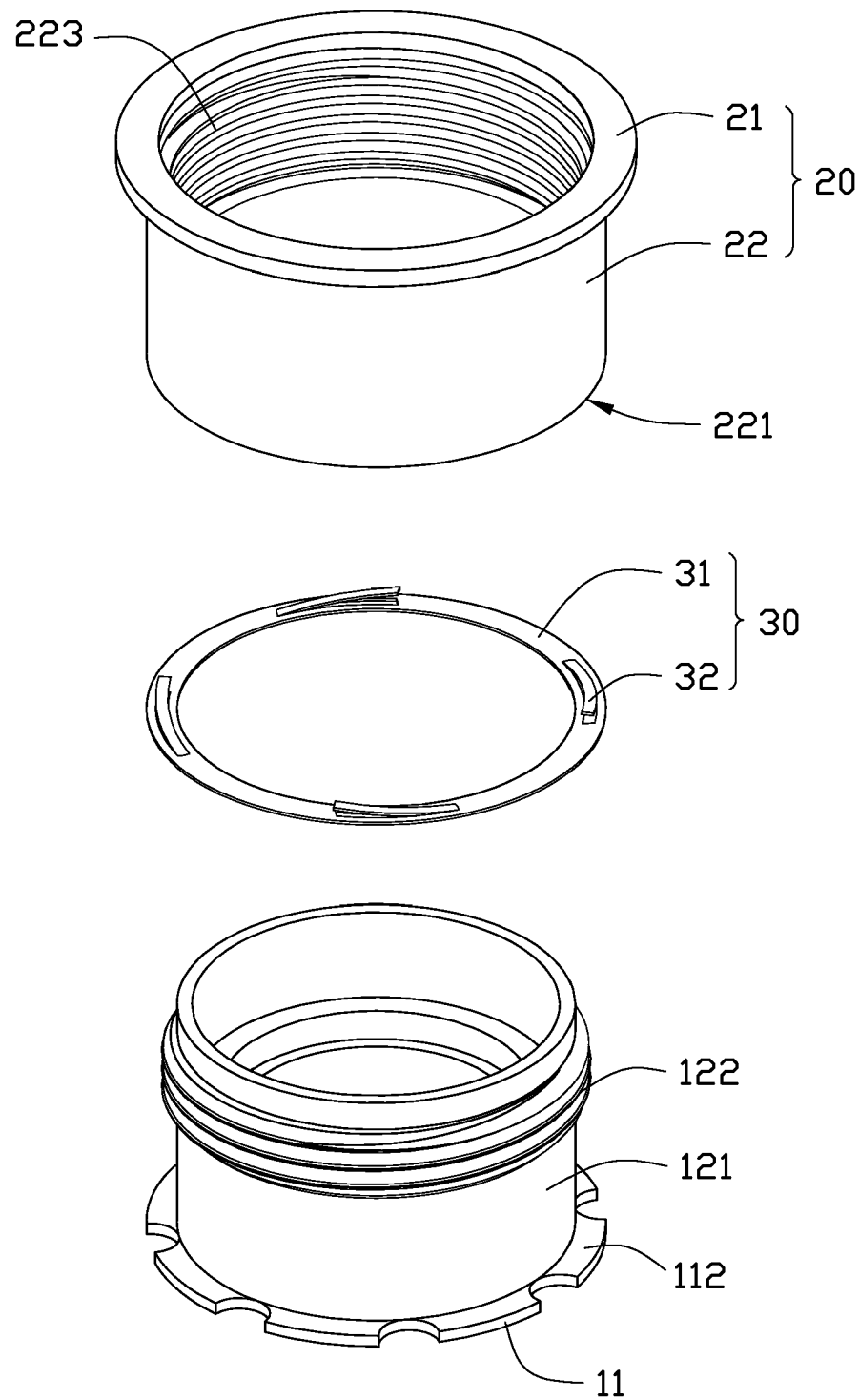
FIG. 2 is an isometric and exploded view of the camera module of FIG. 1, showing the camera module in an inverted state.

Referring to the FIGS. 1-2, a camera module 100, according to an exemplary embodiment, includes a lens barrel 10, a lens holder 20, and a focusing spring 30. The lens barrel 10 is partially received in the lens holder 20, and the focusing spring 30 is compressively interposed between the lens barrel 10 and the lens holder 20.

The lens barrel 10 includes an operation plate 11 and a first body 12 formed on the bottom of the operation plate 11. A first receiving hole 13 extends through the center of the operation plate 11 and the first body 12. The first receiving hole 13 is configured for receiving at least one lens (not shown).

The operation plate 11 is an annulus, and uniformly defines a number of operation grooves 111 around the circumference thereof. The outer diameter of the operation plate 11 exceeds that of the first body 12, thereby a staging surface 112 is formed facing the first body 12.

The first body 12 is of a cylindrical-shape configuration, and includes an outer surface 121. The first body 12 defines an external thread 122 on the outer surface 121. The external thread 122 includes a plurality of external thread teeth 122a with about three windings. The pitches between two adjacent external thread teeth 122a is equal.

The lens holder 20 includes a fixing plate 21 and a second body 22 formed on the top of the fixing plate 21. A second receiving hole 23 extends through the center of the fixing plate 21 and the second body 22. The second receiving hole 23 is configured for receiving the lens barrel 10.

The fixing plate 21 is an annulus and is configured to mount on a base plate (not shown). The outer diameter of the fixing plate 21 exceeds that of the second body 12.

The second body 22 is of a cylindrical-shape configuration, and includes an upper surface 221 and an inner surface 222. The upper surface 221 is away from the fixing plate 21. The second body 22 defines an internal thread 223 formed on the inner surface 222. The internal thread 223 includes a plurality of internal thread teeth 223a with about three windings. The pitches between adjacent two adjacent internal thread teeth 223a is equal. The pitches of the internal thread 223 exceed the tooth thicknesses of the external thread 122. As such, the external thread 122 and the internal thread 223 can loosely mesh with each other.

It should be understood that, the pitches of the external thread 122 can exceed the tooth thicknesseses of the internal thread 223. As such, the external thread 122 and the internal thread 223 can also loosely mesh with each other.

The focusing spring 30 is of a stamped annulus configuration, and is made of metallic materials, such as iron. The focusing spring 30 includes a basic ring 31 and a number of elastic arms 32 extending downward from the bottom of the basic ring 31. The elastic arms 32 are arc-shaped, and are extended along a clockwise direction. In the embodiment, the focusing spring 30 includes four elastic arms 32 uniformly extending downward from the basic ring 31.

Figure 3:
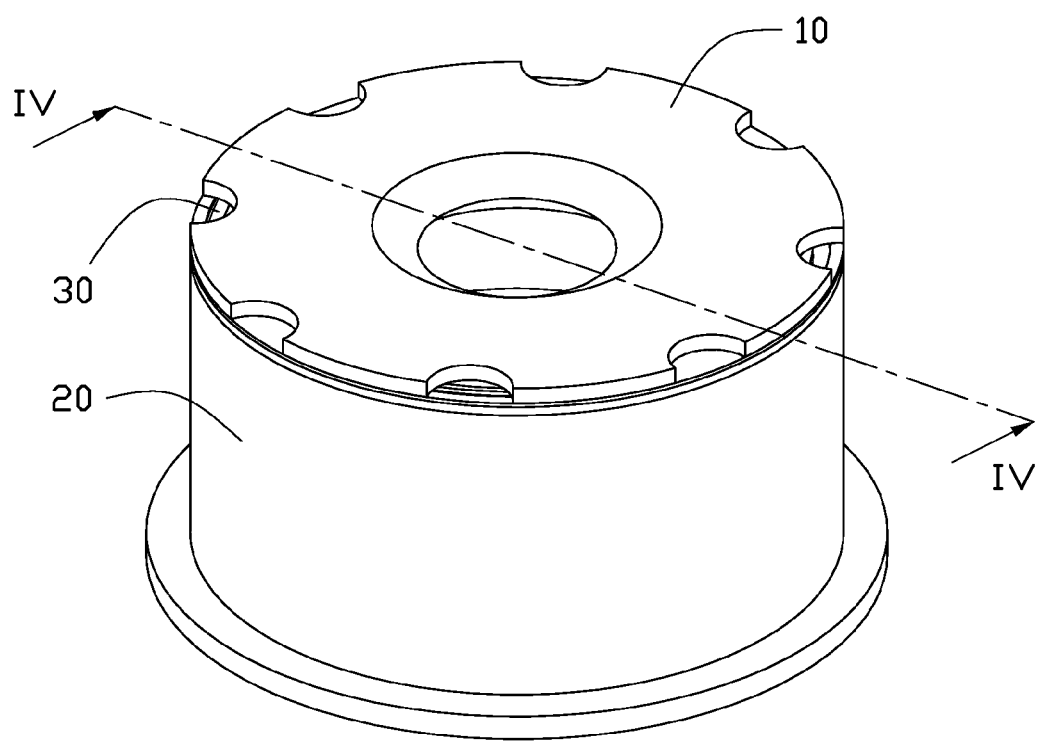
FIG. 3 is an assembled view of the camera module of FIG. 1.
Figure 4:
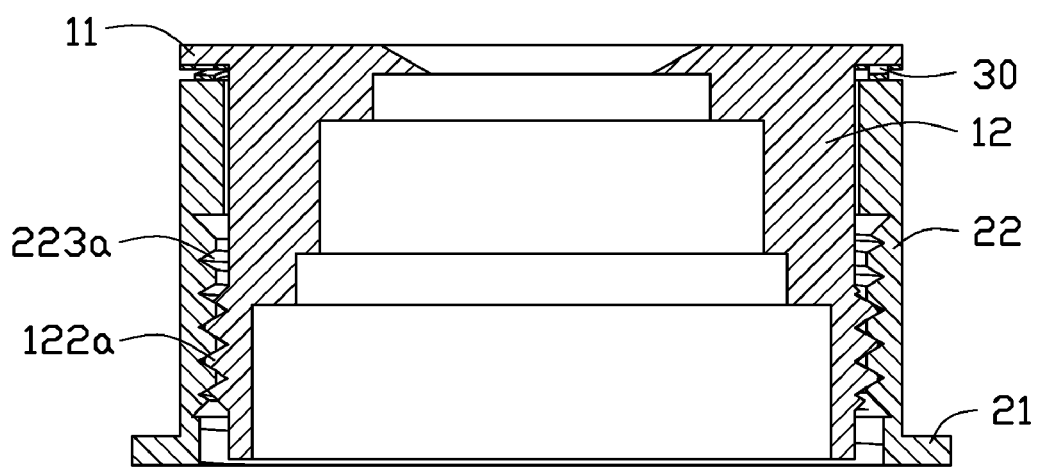
FIG. 4 is a cross-sectional view taken along line IV-IV of FIG. 3.

Referring to the FIGS. 3-4, during assembly, the focusing spring 30 is placed on the upper surface 221 of the lens holder 20, and the elastic arms 32 abuts with the upper surface 221. The lens barrel 10 is received in the second receiving hole 23. The external thread 122 of the lens barrel 10 are screwed and meshed with the internal thread 223 of the lens holder 20. The operation plate 11 of the lens barrel 10 is not yet rotated by an external force until the focusing spring 30 is abutted between the staging surface 112 and the upper surface 221.

Under a normal operating condition, the external thread 122 meshes with the internal thread 223 under the elastic force operated between the staging surface 112 and the upper surface 221. The pitches of the internal thread 223 exceed the tooth thicknesses of the external thread 122, and the lens barrel 10 can be moved slightly along an optical axis of the camera module 100 relative to the lens holder 20. When the camera module 100 needs to focus, external force in a direction facing the fixing plate 21 is being applied on the lens barrel 10. The focusing spring 30 is then compressed, thereby pushing the internal thread 223 out of mesh with the external thread 122. The camera module 100 can be easily focused under a circumferential force exerted on the lens barrel 10.

It will be understood that the above particular embodiments and methods are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A camera module, comprising:

a lens barrel comprising an operation plate and a first body, and the outer diameter of the operation plate exceeds that of the first body, thereby a staging surface is formed facing the first body; the first body comprising an outer surface, and defines an external thread on the outer surface;

a lens holder comprising a second body, and defining a second receiving hole therethrough; the second body includes an upper surface and an inner surface, and defines an internal thread on the inner surface; the lens barrel is received in the second receiving hole, and the external thread of the lens barrel is screwed and meshed with the internal thread of the lens holder; and a focusing spring compressively interposed between the staging surface and the upper surface.

2. The camera module in claim 1, wherein the pitches of the internal thread exceed the tooth thicknesses of the external thread.

3. The camera module in claim 1, wherein the pitches of the external thread exceed the tooth thicknesseses of the internal thread.

4. The camera module in claim 1, wherein the focusing spring comprises a basic ring and a plurality of elastic arms uniformly extending downward from the bottom of the basic ring.

5. The camera module in claim 4, wherein the elastic arms are arc-shaped, and extend along a clockwise direction.

6. The camera module in claim 5, wherein the focusing spring is of a stamped annulus configuration.

7. The camera module in claim 1, wherein the operation plate uniformly defines a plurality of operation grooves around the circumference thereof.

8. The camera module in claim 1, wherein the lens barrel defines a first receiving hole therethrough configured to receive at least one lens.

* * * * *